US009459953B2

(12) United States Patent
Asterjadhi et al.

(10) Patent No.: US 9,459,953 B2
(45) Date of Patent: Oct. 4, 2016

(54) ADDITIONAL ERROR PROTECTION FOR WIRELESS TRANSMISSION

(71) Applicant: QUALCOMM Incorporated, San Diego, CA (US)

(72) Inventors: Alfred Asterjadhi, Chicago, IL (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/619,280

(22) Filed: Feb. 11, 2015

(65) Prior Publication Data

US 2015/0163016 A1    Jun. 11, 2015

Related U.S. Application Data

(62) Division of application No. 13/839,868, filed on Mar. 15, 2013, now Pat. No. 9,075,736.

(60) Provisional application No. 61/749,667, filed on Jan. 7, 2013, provisional application No. 61/756,141, filed on Jan. 24, 2013.

(51) Int. Cl.
*H04L 1/18* (2006.01)
*G06F 11/10* (2006.01)
*H04L 1/00* (2006.01)
(Continued)

(52) U.S. Cl.
CPC ............ *G06F 11/10* (2013.01); *H04L 1/0041* (2013.01); *H04L 1/0045* (2013.01); *H04L 1/0061* (2013.01); *H04L 1/0063* (2013.01); *H04L 1/0066* (2013.01); *H04L 1/0072* (2013.01); *H04L 1/0083* (2013.01); *H04L 1/1614* (2013.01); *H04W 24/02* (2013.01)

(58) Field of Classification Search
None
See application file for complete search history.

(56) References Cited

U.S. PATENT DOCUMENTS 5,307,425 A * 4/1994 Otsuka ................ H04N 1/4053
358/465
5,479,441 A    12/1995 Tymes et al.
6,098,188 A    8/2000 Kalmanek, Jr. et al.
(Continued)

FOREIGN PATENT DOCUMENTS

CA    2618537 A1    7/2008
CN    101232351 A    7/2008
(Continued)

OTHER PUBLICATIONS

International Search Report and Written Opinion—PCT/US2014/010296—ISA/EPO—Apr. 22, 2014.
(Continued)

*Primary Examiner* — Esaw Abraham
(74) *Attorney, Agent, or Firm* — Dang M. Vo

(57) ABSTRACT

Certain aspects of the present disclosure provide methods and apparatus for enhancing error protection for wireless transmissions. The apparatus may generally include a processing system configured to generate a first error check value for a packet to be transmitted to another apparatus, the first error check value generated based on a remaining portion of the packet, and generate a second error check value for the packet based on information known or expected by the other apparatus and other information transmitted in the packet. The apparatus may also include a transmitter configured to transmit the packet to the other apparatus, the packet comprising the first and second error check values.

35 Claims, 11 Drawing Sheets

(51) Int. Cl.
*H04W 24/02* (2009.01)
*H04L 1/16* (2006.01)

(56) References Cited

U.S. PATENT DOCUMENTS

| | | | |
|---|---|---|---|
| 6,141,784 A | 10/2000 | Davis et al. | |
| 6,625,764 B1 | 9/2003 | Dawson | |
| 6,775,804 B1* | 8/2004 | Dawson | H03M 13/09 714/776 |
| 6,782,503 B1 | 8/2004 | Dawson | |
| 7,249,306 B2* | 7/2007 | Chen | H03M 13/091 714/700 |
| 7,366,961 B1 | 4/2008 | Kovacevic et al. | |
| 7,804,835 B2 | 9/2010 | Koppelaar et al. | |
| 7,876,791 B2* | 1/2011 | Jung | H04J 3/0667 370/345 |
| 8,316,267 B2* | 11/2012 | Sun | H04L 1/0047 375/240.02 |
| 8,352,830 B2 | 1/2013 | Landschaft et al. | |
| 8,370,921 B2* | 2/2013 | Duan | H04L 12/4633 713/160 |
| 8,402,343 B2 | 3/2013 | Radulescu | |
| 8,654,626 B2* | 2/2014 | Ichino | H04L 47/6205 370/216 |
| 8,942,214 B2* | 1/2015 | Lee | H04B 7/0636 370/338 |
| 9,131,398 B2* | 9/2015 | Liu | H04W 8/26 |
| 2003/0103480 A1 | 6/2003 | You et al. | |
| 2004/0107398 A1* | 6/2004 | Johnson | H03M 13/09 714/758 |
| 2010/0262887 A1* | 10/2010 | Wilson | H04L 1/0045 714/758 |
| 2011/0026505 A1* | 2/2011 | Trainin | H04W 40/02 370/338 |
| 2011/0176443 A1 | 7/2011 | Astely et al. | |
| 2014/0195882 A1 | 7/2014 | Asterjadhi et al. | |

FOREIGN PATENT DOCUMENTS

| | | |
|---|---|---|
| EP | 0827357 A2 | 3/1998 |
| EP | 1947770 A1 | 7/2008 |
| EP | 2562011 A1 | 2/2013 |
| JP | 2010011296 A | 1/2010 |
| JP | 2012531083 A | 12/2012 |
| JP | 2013046147 A | 3/2013 |
| WO | WO-2010147426 A2 | 12/2010 |

OTHER PUBLICATIONS

Larsson P., et al., "An Origination and Destination Integrity Method; 3eri082a," IEEE Draft; 3ERI082A, IEEE-SA, Piscataway, NJ USA, vol. 802.11, Mar. 26, 1998, pp. 1-7, XP017699365.

Li Y., et al., "IEEE 802.16m Identifying Femtocells Subscriber Groups", IEEE C802.16m-09/1965, IEEE, Aug. 2009, pp. 1-15, URL: http://www.ieee802.org/16/tgm/docs/C80216m-09_1965.pdf.

* cited by examiner

| 3 | 2(1) 0 | 12 | 0(1) 2 | 8 | 1 | 4 | 6 |
|---|---|---|---|---|---|---|---|
| Type | BlockAck ID | Starting Sequence Control | Reserved | BlockAck Bitmap | NDP Indication | CRC | Tail |

Type-I
800

| 3 | 6(5) 4 | 12 | 0(1) 2 | 16 | 1 | 4 | 6 |
|---|---|---|---|---|---|---|---|
| Type | BlockAck ID | Starting Sequence Control | Reserved | BlockAck Bitmap | NDP Indication | CRC | Tail |

Type-II
850

| 3-4 | 9 | 9 | 2 | 1 | 1 | 1 | 4 | 6 |
|---|---|---|---|---|---|---|---|---|
| Type | RA | TA | Preferred MCS | UDI | Reserved | NDP Indication | CRC | Tail |

Type-I
900

| 3-4 | 9 | 9 | 4 | 9 | 3 | 1 | 4 | 6 |
|---|---|---|---|---|---|---|---|---|
| Type | RA | TA | Preferred MCS | UDI | Reserved | NDP Indication | CRC | Tail |

Type-II
950

ADDITIONAL ERROR PROTECTION FOR WIRELESS TRANSMISSION

CLAIM OF PRIORITY UNDER 35 U.S.C. §120

The present Application for patent is a divisional of U.S. patent application Ser. No. 13/839,868, filed Mar. 15, 2013, issued as U.S. Pat. No. 9,075,736, which claims benefit of U.S. Provisional Patent Application No. 61/749,667, filed Jan. 7, 2013 and U.S. Provisional Patent Application No. 61/756,141, filed Jan. 24, 2013 which are assigned to the assignee hereof and hereby expressly incorporated herein by reference in its entirety.

FIELD OF THE INVENTION

Certain aspects of the present disclosure generally relate to wireless communications and, more particularly, to techniques that may provide additional error protection for wireless transmissions.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a receiver configured to receive a packet from another apparatus, the packet comprising a first error check value generated based on a remaining portion of the packet and a second error check value generated based on information known or expected by the apparatus and other information transmitted in the packet; and a processing system configured to perform a first error check of the packet based on a comparison of the first error check value and an error check value generated by the apparatus for the remaining portion of the packet, reconstruct a value of the known or expected information based on the second error check value and the other information transmitted in the packet, perform a second error check of the packet based on comparison of the reconstructed value and an expected value of the information known or expected by the apparatus, and discard the packet if either the first error check fails or the reconstructed value differs from the expected value.

Certain aspects of the present disclosure provide an apparatus for wireless communications. The apparatus typically includes a processing system configured to generate a first error check value for a packet to be transmitted to another apparatus, the first error check value generated based on a remaining portion of the packet, generate a second error check value for the packet based on information known or expected by the other apparatus and other information transmitted in the packet and a transmitter configured to transmit the packet to the other apparatus, the packet comprising the first and second error check values.

Certain aspects of the present disclosure provide an apparatus for wireless communications. The apparatus typically includes means for receiving a packet from another apparatus, the packet comprising a first error check value generated based on a remaining portion of the packet and a second error check value generated based on information known or expected by the apparatus and other information transmitted in the packet, means for performing a first error check of the packet based on a comparison of the first error check value and an error check value generated by the apparatus for the remaining portion of the packet, means for reconstructing a value of the known or expected information based on the second error check value and the other information transmitted in the packet, means for performing a second error check of the packet based on comparison of the reconstructed value and an expected value of the information known or expected by the apparatus, and means for discarding the packet if either the first error check fails or the reconstructed value differs from the expected value.

Certain aspects of the present disclosure provide an apparatus for wireless communications. The apparatus typically includes means for generating a first error check value for a packet to be transmitted to another apparatus, the first error check value generated based on a remaining portion of the packet, means for generating a second error check value for the packet based on information known or expected by the other apparatus and other information transmitted in the packet, and means for transmitting the packet to the other apparatus, the packet comprising the first and second error check values.

Certain aspects of the present disclosure provide a method for wireless communications by an apparatus. The method typically includes receiving a packet from a device, the packet comprising a first error check value generated based on a remaining portion of the packet and a second error check value generated based on information known or expected by the apparatus and other information transmitted in the packet, performing a first error check of the packet based on a comparison of the first error check value and an error check value generated by the apparatus for the remaining portion of the packet, reconstructing a value of the known or expected information based on the second error check value and the other information transmitted in the packet, performing a second error check of the packet based on comparison of the reconstructed value and an expected value of the information known or expected by the apparatus, and discarding the packet if either the first error check fails or the reconstructed value differs from the expected value.

Certain aspects of the present disclosure provide a method for wireless communications by an apparatus. The method typically includes generating a first error check value for a packet to be transmitted to another apparatus, the first error check value generated based on a remaining portion of the packet, generating a second error check value for the packet based on information known or expected by the other apparatus and other information transmitted in the packet, and transmitting the packet to the other apparatus, the packet comprising the first and second error check values.

Certain aspects of the present disclosure provide a computer program product for wireless communications by an apparatus comprising a computer-readable medium having instructions stored thereon. The instructions are generally executable by one or more processors for receiving a packet from another apparatus, the packet comprising a first error check value generated based on a remaining portion of the packet and a second error check value generated based on information known or expected by the apparatus and other information transmitted in the packet, performing a first error check of the packet based on a comparison of the first error check value and an error check value generated by the apparatus for the remaining portion of the packet, reconstructing a value of the known or expected information based on the second error check value and the other information transmitted in the packet, performing a second error check of the packet based on comparison of the reconstructed value and an expected value of the information known or expected by the apparatus, and discarding the packet if either the first error check fails or the reconstructed value differs from the expected value.

Certain aspects of the present disclosure provide a computer program product for wireless communications by an apparatus comprising a computer-readable medium having instructions stored thereon. The instructions are generally executable by one or more processors for generating a first error check value for a packet to be transmitted to another apparatus, the first error check value generated based on a remaining portion of the packet, generating a second error check value for the packet based on information known or expected by the other apparatus and other information transmitted in the packet, and transmitting the packet to the other apparatus, the packet comprising the first and second error check values.

Certain aspects of the present disclosure provide a station. The station typically includes at least one antenna, a receiver configured to receive, via the at least one antenna, a packet from another station, the packet comprising a first error check value generated based on a remaining portion of the packet and a second error check value generated based on information known or expected by the apparatus and other information transmitted in the packet, and a processing system configured to perform a first error check of the packet based on a comparison of the first error check value and an error check value generated by the station for the remaining portion of the packet, reconstruct a value of the known or expected information based on the second error check value and the other information transmitted in the packet, perform a second error check of the packet based on comparison of the reconstructed value and an expected value of the information known or expected by the station, and discard the packet if either the first error check fails or the reconstructed value differs from the expected value.

Certain aspects of the present disclosure provide a station. The station typically includes at least one antenna, a processing system configured to generate a first error check value for a packet to be transmitted to another station, the first error check value generated based on a remaining portion of the packet, generate a second error check value for the packet based on information known or expected by the other station and other information transmitted in the packet; and a transmitter configured to transmit, via the at least one antenna, the packet to the other station, the packet comprising the first and second error check values.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 8A and 8B illustrate example embodiments, in which aspects of the present disclosure may be applied to a Block Acknowledgement frame.

FIGS. 9A and 9B illustrate example embodiments, in which aspects of the present disclosure may be applied to a PS-Poll frame.

Figure 1:
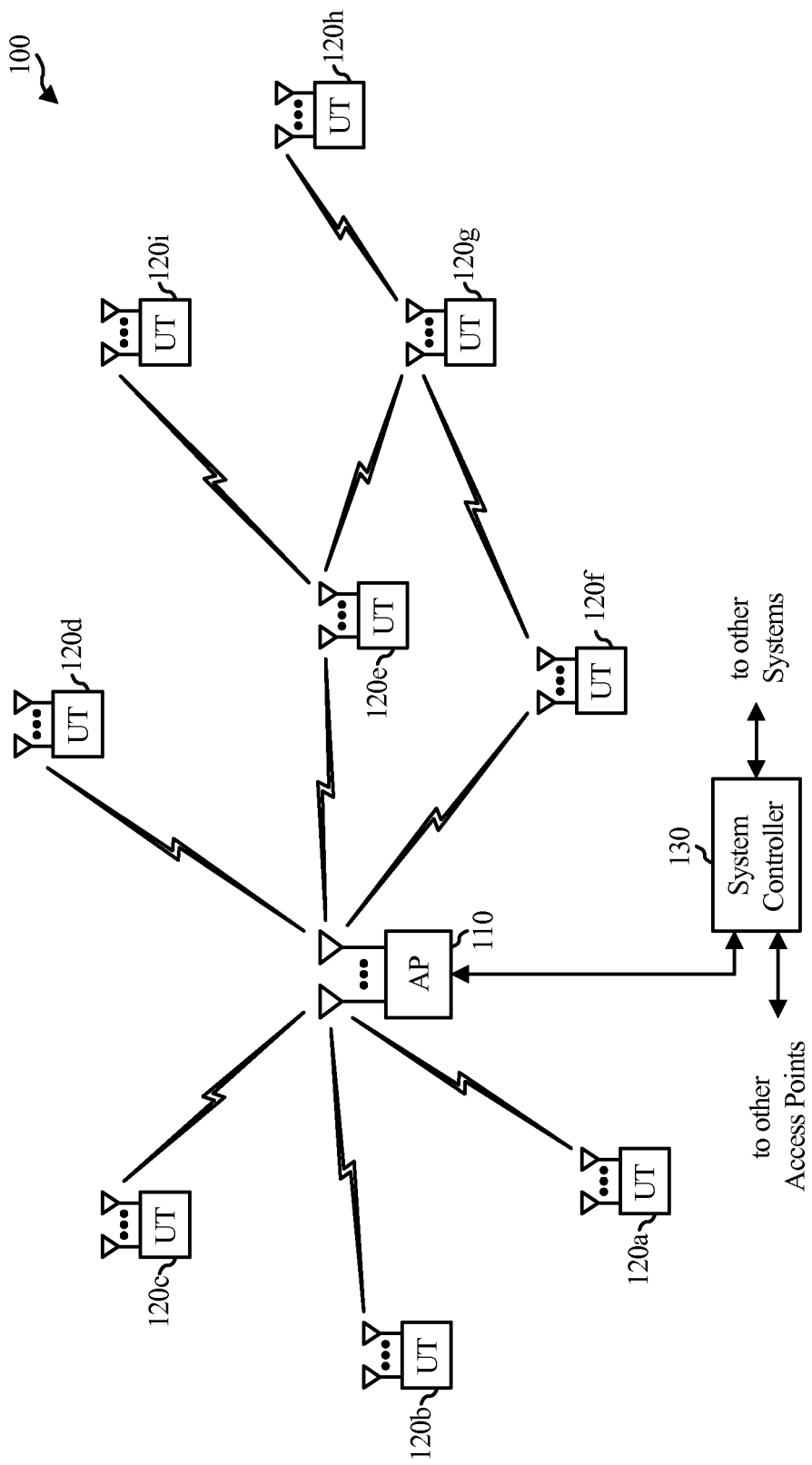
FIG. 1 illustrates a diagram of an example wireless communications network, in accordance with certain aspects of the present disclosure.

The APPENDIX includes example details for applying techniques of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
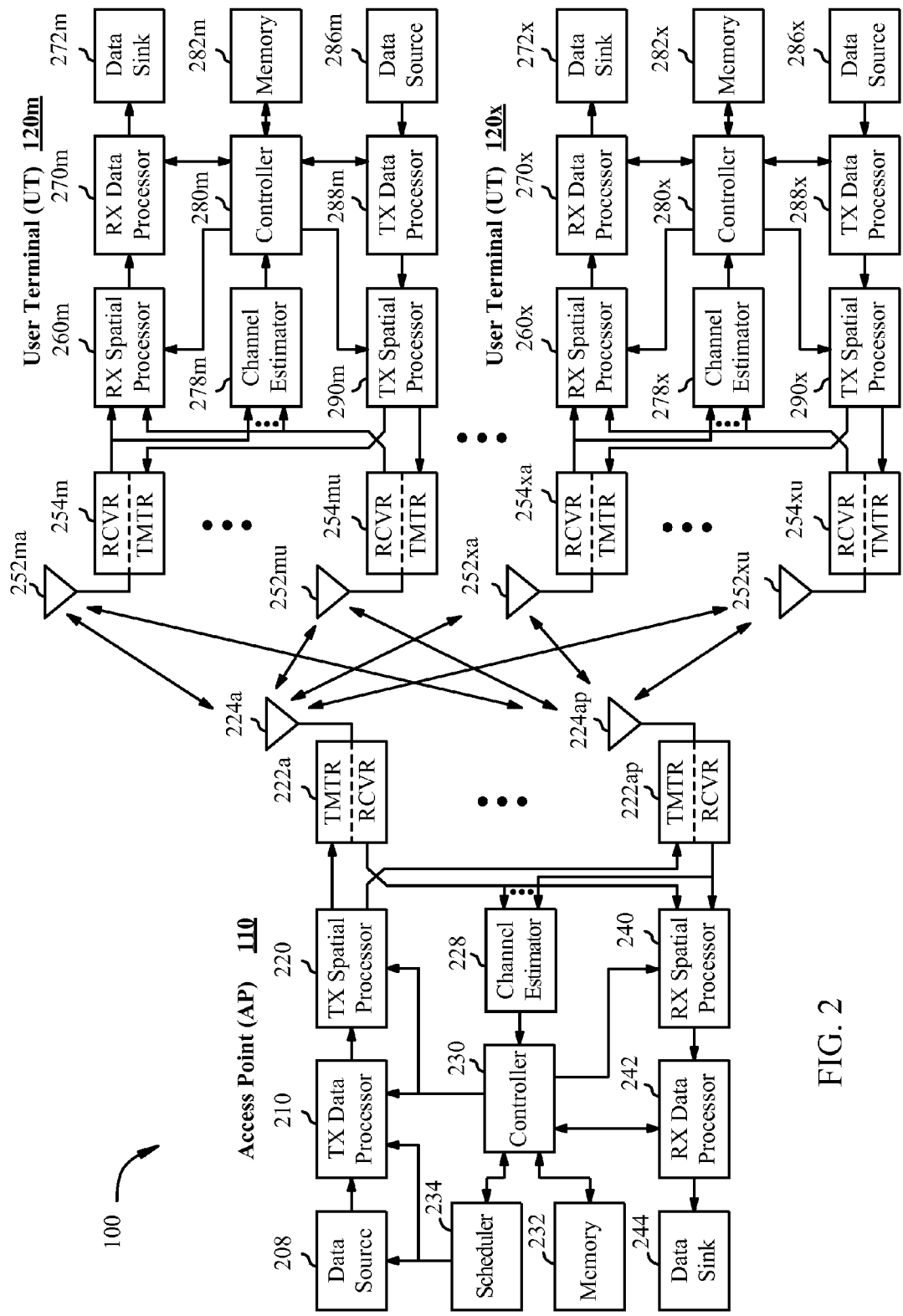
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
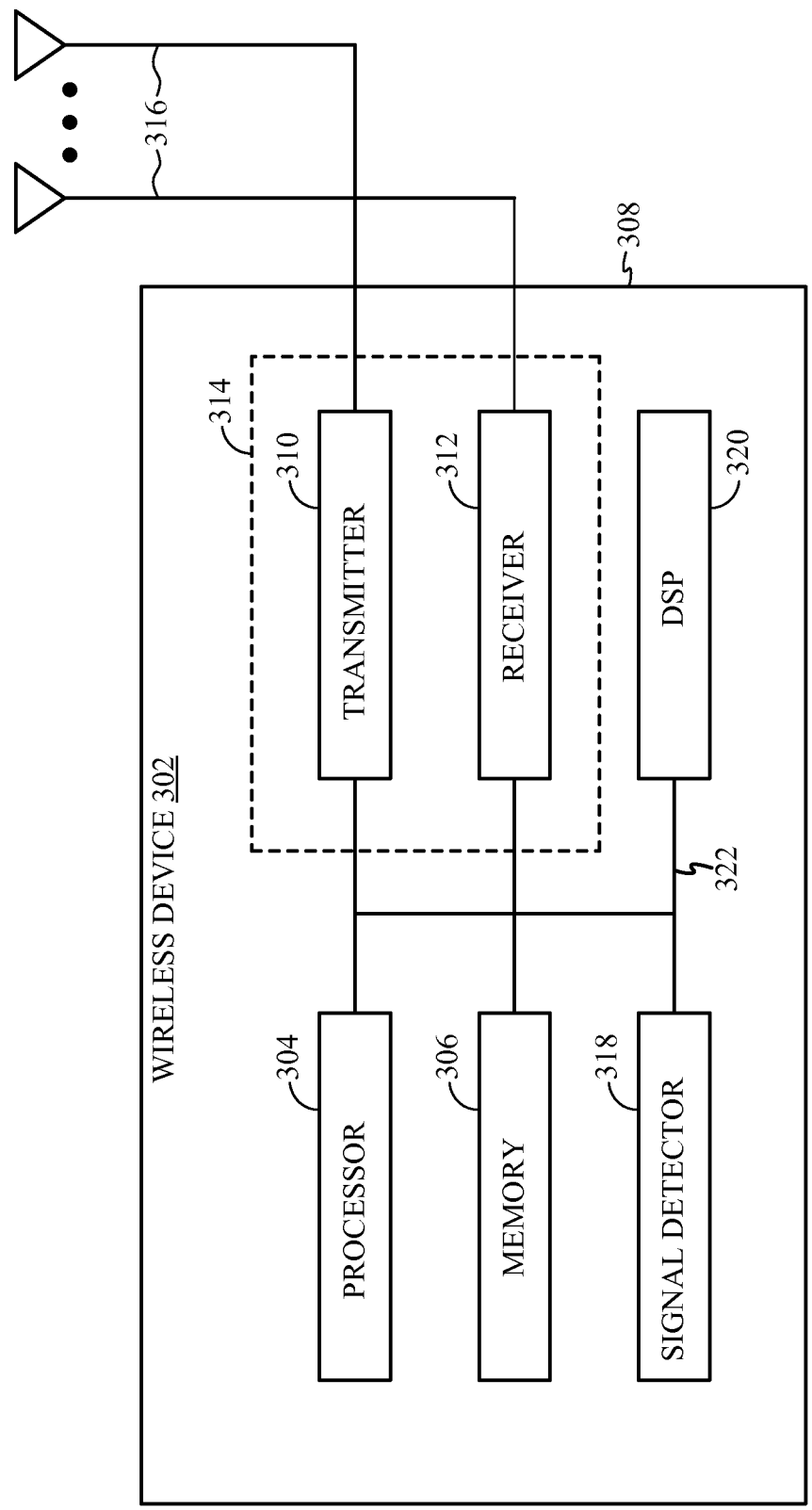
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Additional Error Protection for Wireless Transmission

Aspects of the present disclosure provide techniques that may be employed to provide additional error protection for wireless transmissions. For example, the techniques presented herein may be applied to achieve enhanced robustness for transmitted Null Data Packet (NDP) frames.

Standards bodies have introduced null data packets (NDPs) for certain frames. For example, NDPs may be used for various control frames (e.g., CTS, PS-Poll, Paging, ACK, BlockAck), management frames (e.g., Probe Request, Probe Response), Beamforming Report Poll, and the like. One common purpose of an NDP may be to allow measurements of channel conditions between the transmitting entity and the recipients, who may report such measurements.

Figure 4A:
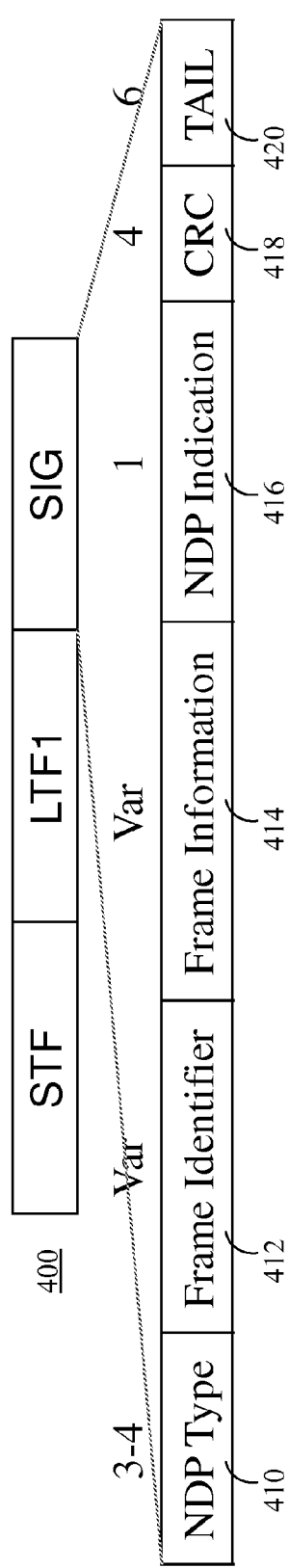
FIGS. 4A and 4B illustrate example frame formats, to which aspects of the present disclosure may be applied.

FIG. 4A illustrates the General NDP frame format 400, with a short training field (STF) 402, long training field (LTF) 404, and a signal (SIG) field 408. As illustrated, the SIG field 408 may include various fields (or subfields), such as an NDP Type 410, Frame Identifier 412, Frame Information 414, NDP Indication 416, CRC 418, and TAIL 420. The NDP Type indicates the frame type (e.g., CTS, ACK, Block-Ack, etc.), the Frame Identifier allows identification of the frame by using information known at the intended receiver (and/or transmitter), and the Frame information includes useful information exchanged between RX/TX.

According to certain aspects, a General NDP frame format does not include the Frame Information as one or more fields or subfields, but instead this information may be encoded ("hidden") in a Frame Identifier using the techniques described herein. As will be described below, this may help provide additional error protection by allowing certain errors in transmission to be detected.

The CRC is the cyclic redundancy check—an example of an error check value calculated based on one or more of the other fields of the frame—which protects the NDP frame. The CRC is typically 4 bits in length, which may not be sufficient to provide full protection. For example, it is possible (e.g., in cases of severe interference) that the CRC check passes and any of the Frame Information bits or of other fields may be switched.

Aspects of the present disclosure, however, may provide additional error protection by taking advantage of the fact that some of the information transmitted in an NDP frame may be known by the receiving device.

Figure 4B:
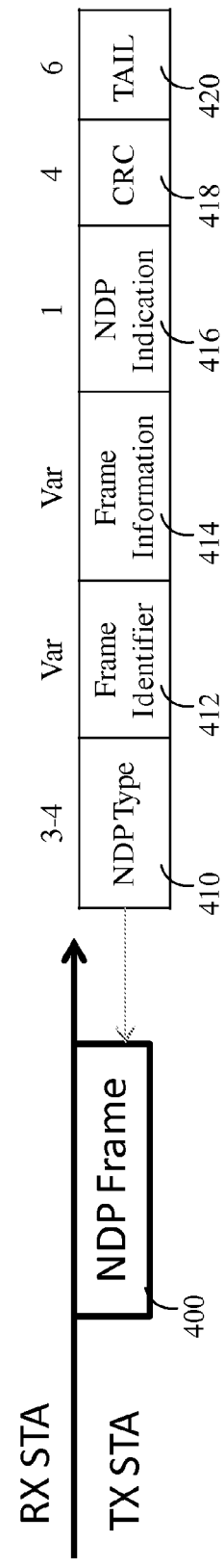

For example, as illustrated in FIG. 4B, a transmitting station (TX STA) may send an NDP frame 400 with a Frame Identifier, which is known at a receiving station (RX STA).

As an example, the Frame Identifier may be the part of the MAC Address of the RX STA or of the TX STA. In one embodiment, the Frame Identifier may be at least one of a part of the association identity (AID) and a part of the MAC Address of the RX STA or of the TX STA. In another embodiment, the Frame Identifier of the NDP frame may consist of information obtained from a previously transmitted frame that may solicit an NDP frame response. As an example, the Frame Identifier may be part of the FCS, CRC, Scrambler or other information associated with the previously transmitted frame, such as, for example, a sequence number, packet number, or the like.

The RX STA may accept the NDP Frame if one or more conditions are met, such as but not limited to, the CRC passes (meaning a CRC calculated at the RX STA for the remaining portion of the packet matches the CRC calculated at the TX-STA and transmitted with the packet) and the RX STA is the intended receiver based on the Frame identifier. In other words, a non intended receiver would discard the packet based on the frame identifier. The RX STA may also discard the packet for other reasons, for example, if the NDP type is wrong. The frame identifier is, thus, ideally long enough to ensure uniqueness of ID with high probability (e.g., a BA ID may be extended with an implicit ID).

Aspects presented herein, however, may help enhance protection in those cases where the CRC passes and there may still be errors in the Frame information field. It should be noted that, according to techniques presented herein, if there is any error in frame identifier the RX STA discards the packet anyways. In another embodiment, aspects presented herein, may provide protection for frames that do not include CRC protection of the information.

Figure 5:
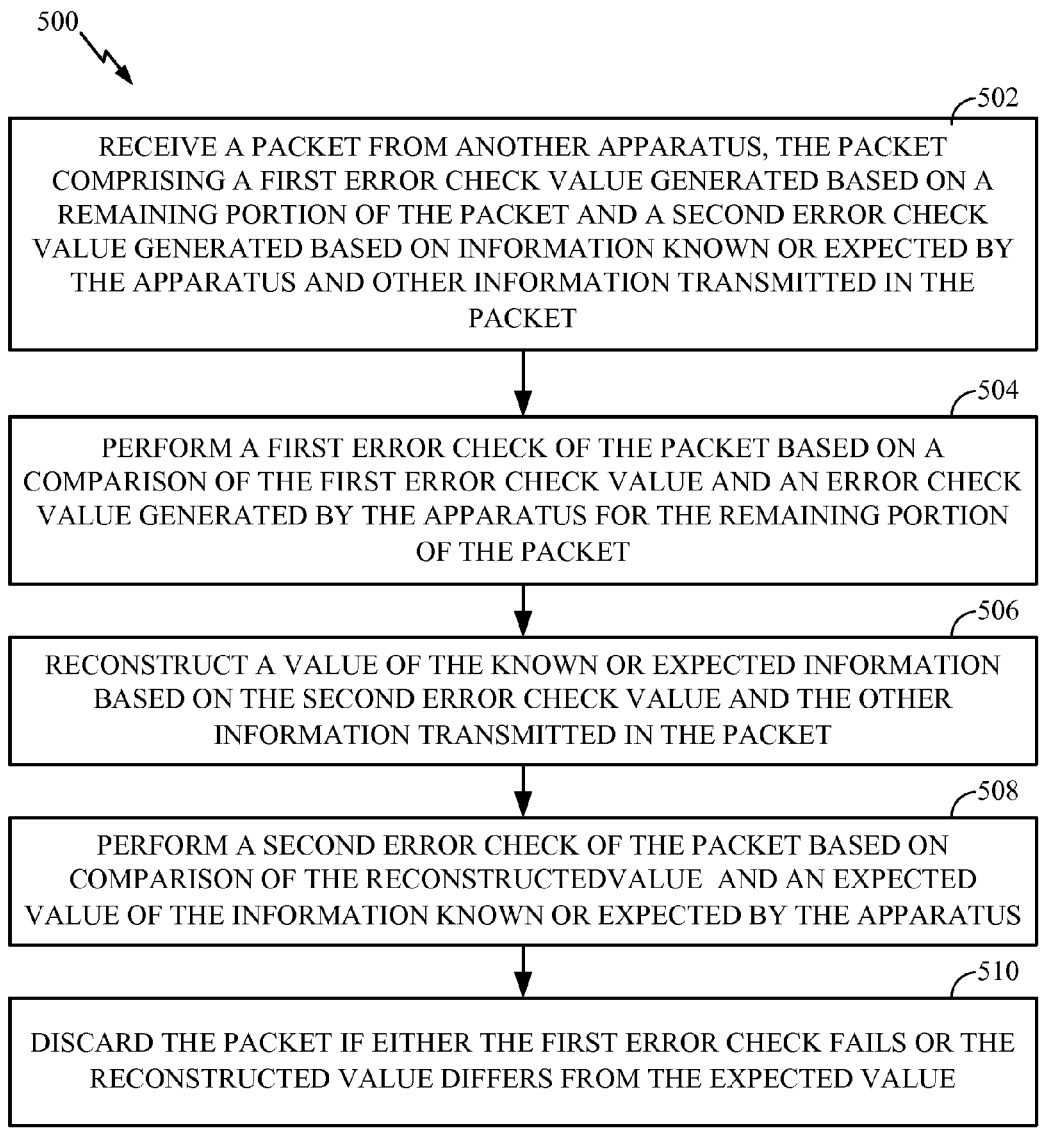
FIG. 5 illustrates a block diagram of example operations for wireless communications by a recipient, in accordance with certain aspects of the present disclosure.

FIG. 5 is a block diagram of example operations 500 for wireless communications by a receiving apparatus, in accordance with aspects of the present disclosure. The operations 500 may be performed by an apparatus, such as the receiving station (RX-STA) referenced in FIG. 4B.

At 502, the apparatus receives a packet from a device, the packet comprising a first error check value generated based on a remaining portion of the packet and a second error check value generated based on information known or expected by the apparatus and other information transmitted in the packet. At 504, the apparatus performs a first error check of the packet based on a comparison of the first error check value and an error check value generated by the apparatus for the remaining portion of the packet.

At 506, the apparatus reconstructs a value of the known or expected information based on the second error check value and the other information transmitted in the packet. At 508, the apparatus performs a second error check of the packet based on comparison of the reconstructed value and an expected value of the information known or expected by the apparatus. At 510, the apparatus discards the packet if either the first error check fails or the reconstructed value differs from the expected value.

Figure 6:
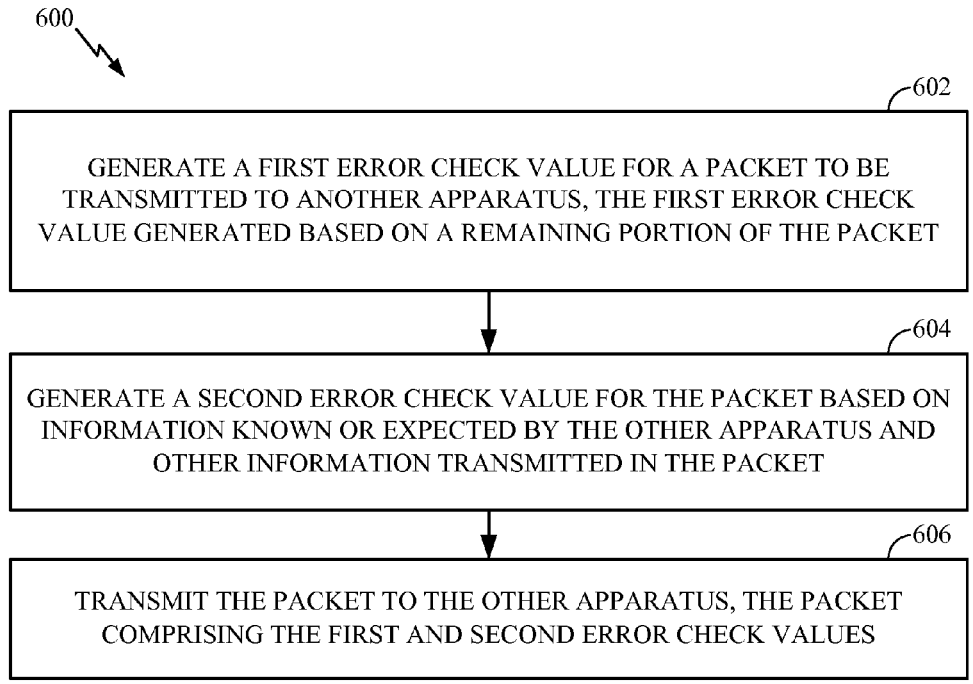
FIG. 6 illustrates a block diagram of example operations for wireless communications by an originator, in accordance with certain aspects of the present disclosure.

FIG. 6 is a block diagram of example operations 600 for wireless communications by a transmitting apparatus, in accordance with aspects of the present disclosure. The operations 600 may be performed by an apparatus, such as the TX-STA referenced in FIG. 4B. Thus, the operations may be considered complementary to those shown in FIG. 5.

At 602, the apparatus generates a first error check value for a packet to be transmitted to another apparatus, the first error check value generated based on a remaining portion of the packet. At 604, the apparatus generates a second error check value for the packet based on information known or expected by the other apparatus and other information transmitted in the packet. At 606, the apparatus transmits the packet to the other apparatus, the packet comprising the first and second error check values.

In this manner, the second error check value may allow a receiving device to detect eventual errors in a remaining portion of the packet when a CRC passes (i.e., residual errors undetected by the first error check). The general idea of generating a second error check value based on information, the value of which is known (or expected) at the receiver is shown in FIG. 7.

Figure 7:
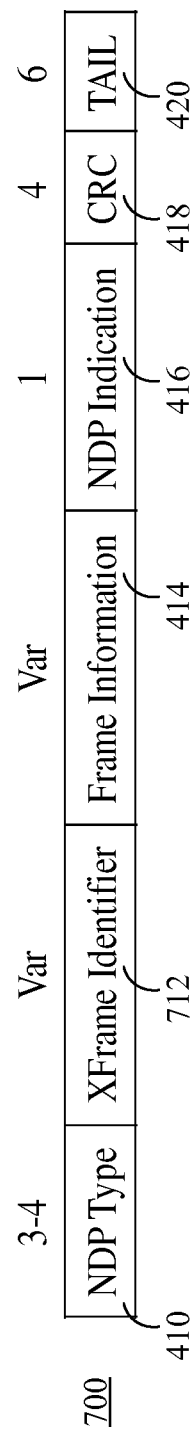
FIG. 7 illustrates an example frame format with additional error protection, in accordance with certain aspects of the present disclosure.

As illustrated in FIG. 7, an NDP frame format 700 may have fields in common with the general frame format 400 shown in FIG. 4. However, the frame format 700 may have a second error check value 712. The second error check value 712 may be considered a type of modified frame identifier (referred to herein as an "XFrame Identifier").

According to certain aspects, at the transmitting entity (e.g., TX STA), this XFrame Identifier may be generated by performing a logical XOR between the (conventional) Frame Identifier and known Frame Information. Examples of fields that may be used for XFrame Identifier and Frame Information are described below, with reference to FIGS. 8-10.

In one embodiment, the transmitting entity (e.g., TX STA), may recursively apply the logical XOR (in general the logical function) multiple times with the aid of a window shifting function (e.g., m-bit shifting) to the Frame Identifier and the known Frame Information in order to increase protection of Frame Information.

This may be illustrated by considering a relatively simple example where Frame Identifier is the 6 bit long sequence 010010 and known Frame Information is the 4 bit long sequence 0101. The obtained XFrame Identifier=XOR (Frame Identifier, [0 0|Frame Information]) is 010111 where two zeros are prepended (concatenated) to the Frame Information to have equal length fields. Note that in this example the effective XORing is performed between the Frame Information and the Least Significant Bits (LSBs) of the Frame Identifier. The first 2 Most Significant Bits (MSBs) of the XFrame Identifier remain the same as the ones of Frame Identifier. In this simple example, the transmitting entity includes in the packet to be transmitted the XFrame Identifier=010111 and the Frame Information=0101.

In order to increase protection, the transmitting entity may apply XORing an additional time after, for example, 1 bit-shifting the bits of the XFrame Identifier that will be XORed again with the Frame Information. In this case, the new Xframe Identifier=XOR(XFrame Identifier, [0|Frame Information|0]) would be equal to 011101. In one embodiment, the transmitting entity may only include the Xframe Identifier and not include the Frame Information in the transmitted frame.

As may be clear for those who are skilled in the art, the techniques presented herein may be applied multiple times in order to increase protection of the Frame Identifier field. As an example, a third error check (e.g., a parity bit) may be applied to the Frame Identifier prior to the application of the logical function (e.g., XORing). In this example, the Frame Identifier field and the parity bit may be given as an input to the logical function. In this example, the transmitter is able to detect an error in the Frame Identifier field if any of the first, second or third error check fails.

In any case, at the receiving entity (RX STA), the original Frame Identifier may be reconstructed using the received XFrame Identifier and the known/expected information, as follows:

Frame Identifier=XOR (Xframe Identifier, Frame Information)

In this manner, if any bit in the Frame information is incorrect when received, the reconstructed Frame identifier may also be in error (and not match the expected value). Thus, in this case, the RX STA may discard the packet also in some of those cases where Frame information is incorrect, even though the CRC passed.

In one embodiment, the receiving entity may receive a packet that contains an Xframe Identifier but does not contain Frame Information field. In this embodiment, the receiver may apply the XOR function to the Xframe Identifier and its expected Frame identifier in order to obtain the Frame Information hidden in the XFrame Identifier.

Note that there may be cases where the previously discussed scheme may not be able to detect some of the errors that may appear in the Frame Information. For example, consider a received NDP frame that passes the CRC check, and it has one error in the first bit of the Xframe identifier and another error in the same bit location (i.e., the first bit) of the Frame Information. In this case, according to the previous scheme, the frame would be accepted because the Frame Identifier is the one expected (the error of the frame identifier will be correct as the error of the Xframe Identifier cancels the error in the same location in the frame information). This may be illustrated by the following simple example:

TX_frame Identifier=10, TX_Frame_information= 00=>TX_frame Identifier=10.

If receiving a corrupted frame with same error in same location (flipped $1^{st}$ bit):

RX_Xframe Identifier=00, RX_Frame_information=10.

In this case, XORing of RX_XFrame Identifier with RX_Frame_information=10 which is the same as TX_frame identifier but error in frame information is performed. For additional protection one may apply the same technique recursively at the transmitter multiple times as previously described (and in a spectral way at the receiver) in order to detect these types of errors with some of the rules explained below.

In one embodiment, the transmitter may apply the logical function (in our example XOR) multiple times, for example, by splitting the Frame identifier in multiple subintervals which have the same length of the Frame Information, as follows:

1) XFrame Identifier1=XOR(Frame Identifier1, Frame Information)

2) Xframe_Identifier2=XOR(Frame Identifier2, Frame information)

The receiver may apply the logical function at the received Xframe Identifiers as explained previously to obtain the multiple subintervals of the Frame Identifier. In another embodiment, the logical function may be applied recursively multiple times relying on bit shifting or some other function. In our simple example with recursive 1 bit shifting, the receiver is able to obtain the Frame Identifier by applying the XOR function twice.

FIGS. 8A and 8B illustrate examples of applying the techniques presented herein to an NDP BlockAck frame. As illustrated, for a Type-I NDP Block Ack 800 shown in FIG. 8A (1 MHz PHY Preamble), errors in (1 Octet) of a Block Ack (BA) Bitmap may be detected by generating an error check value (e.g., X Frame ID) based on any 8 bits (TX and RX must have common knowledge of the location of these bits, for example, most significant bits (MSBs)) of a Starting Sequence Control field value and the BA Bitmap:

XOR(8MSB(SSC), BlockAck Bitmap).

As the receiving entity expects a particular value of the, for example, 8 MSBs of the SSC, if the reconstructed value of this field does not match the expected value, this may potentially indicate an error in the BA Bitmap. Note that the 8 bits can be selected anywhere from the NDP Type field, BA ID field and SSC field as this is known (or expected) information at the receiver. As illustrated in FIG. 8B, for a Type-II NDP Block Ack 850 (2 MHz PHY Preamble), errors in (2 Octets) of a Block Ack (BA) Bitmap may be detected by generating an error check value (e.g., X Frame ID) based on any 16 bits (TX and RX must have common knowledge of the location of these bits, for example a (a concatenation of) 4 bits of BlockACK ID and 12 bits of SSC), and the BA Bitmap:

XOR ((BlockAck ID∥SSC), BlockAck Bitmap).

It may be noted that Reserved bits may either be treated as known information (e.g., set to 0) or as additional information (e.g., TX info). In general, BlockAck ID, Starting Sequence Control, NDP Type (and any combination of at least one or more of part of them) may be treated as a "modified" frame identifier (second error check value). In addition, one or more currently Reserved bits may be used as well. BlockAck Bitmap and (possibly) Rsvd bits may also be treated as Frame Information (protected with a generated second error check value).

FIGS. 9A and 9B illustrate examples of applying the techniques presented herein to a Type-1 NDP PS-Poll frame 900 (FIG. 9A) and a Type-II NDP PS-Poll frame 950 (FIG. 9B). As illustrated, in this case, the Receive Address (RA) may be used as the Frame identifier (to carry the second error check value). In some cases, values of the Preferred modulation and coding scheme (MCS) field, unknown device identifier (UDI), a delayed reverse direction grant (RDG) field, or any combination or partial value may be treated as Frame Information—and used to generate (and be protected by) the second error check value. For example, 5 MSBs of a UDI may be used. Reserved bits may also be used, as discussed above with reference to the NDP BA frame.

Figure 10:
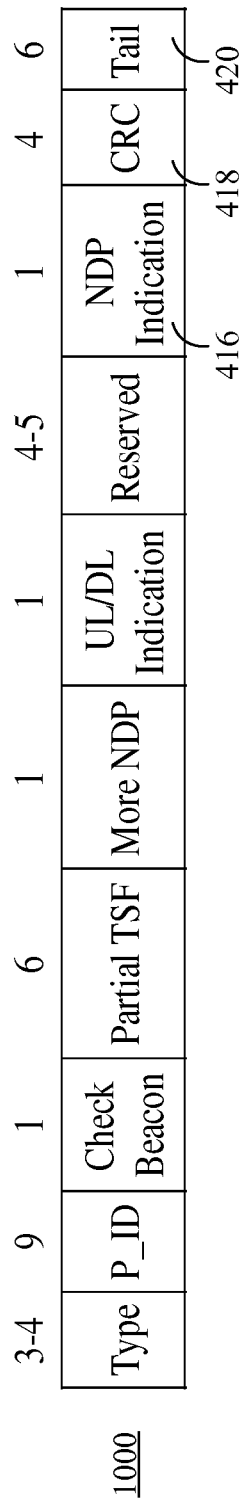
FIG. 10 illustrates example embodiment, in which aspects of the present disclosure may be applied to a Paging frame.

FIG. 10 illustrates an example of applying the techniques presented herein to an NDP paging frame 1000. As illustrated, in this case, the P_ID field may be used as the Frame identifier. In some cases, values of the Check Beacon, Partial TSF, More NDP, Uplink/Downlink Indication Fields or any combination or partial value may be treated as Frame Information—and used to generate (and be protected by) the second error check value. Reserved bits may also be used, as discussed above with reference to the NDP BA frame.

The techniques presented herein may also be applied to enhance error protection for other types of NDP Frames. For example, for an NDP Ack frame, an ACK ID may be used as a Frame Identifier, while remaining fields (e.g., More Data, Duration etc) may be used as Frame Information. For NDP CTS frames, CTS ID (partial TA etc) may be used as Frame Identifier, while remaining fields may be used as Frame Information. The techniques may also be used for NDP Probe Request and Response frames. In this case, similar considerations as discussed above may be made, for example, information known at the receiver may be used as frame identifier and remaining fields as Frame Information.

Figure 5A:
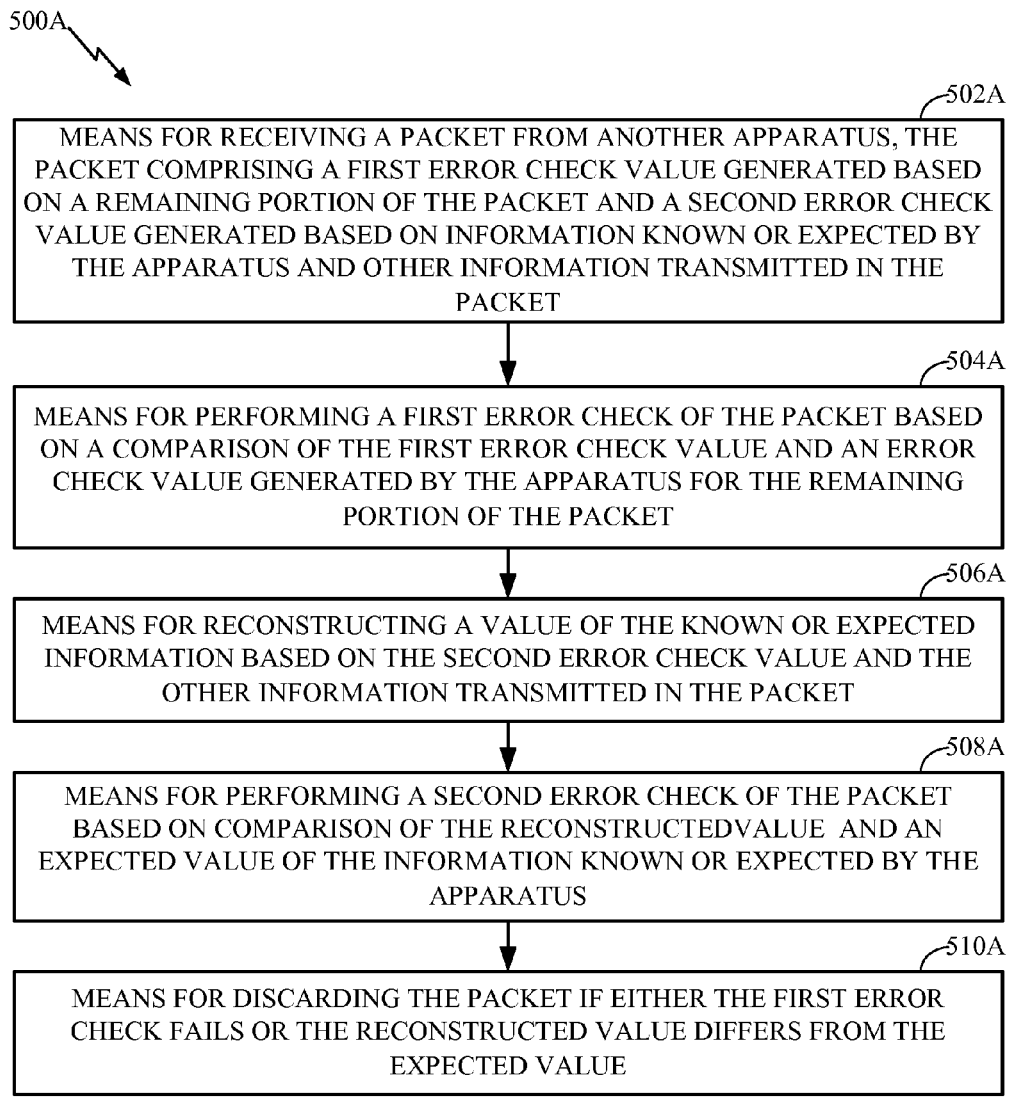
FIG. 5A illustrates example means capable of performing the operations shown in FIG. 5.
Figure 6A:
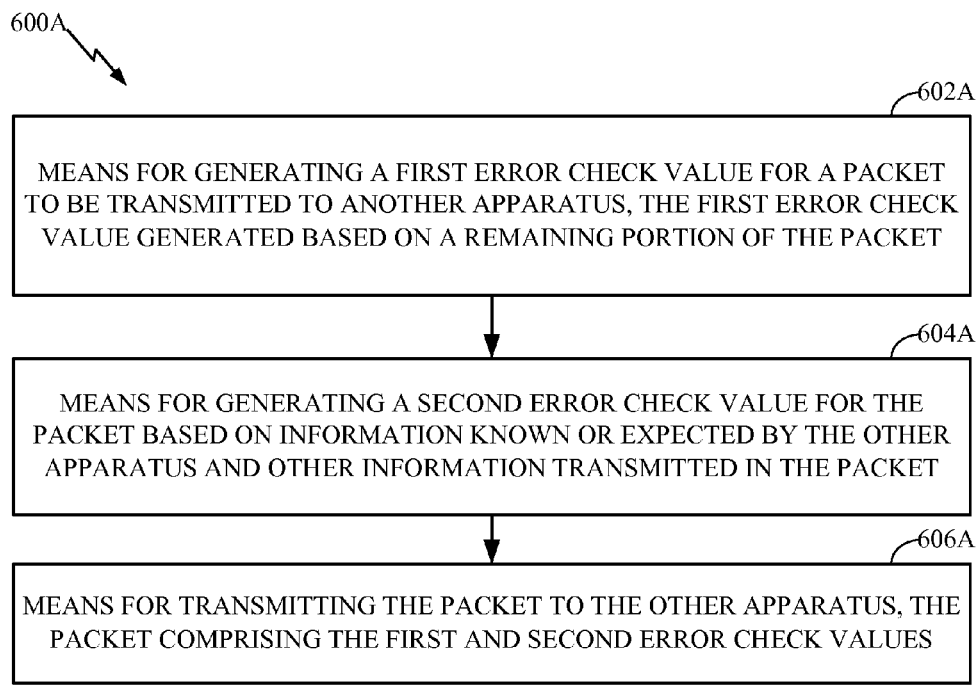
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface (in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to:
        generate a first error check value for a packet to be transmitted to another apparatus, the first error check value generated based on first information in the packet,
        generate a second error check value for the packet based on second information in the packet that is known by the other apparatus and third information in the packet; and
    a transmitter configured to transmit the packet to the other apparatus, the packet comprising the first and second error check values.

2. The apparatus of claim 1, wherein the second error check value is generated by performing a logical XOR operation with the second information and the third information.

3. The apparatus of claim 1, wherein:
    the second information comprises a corresponding value of at least a portion of a frame identifier field.

4. The apparatus of claim 3, wherein the third information used to generate the second error check value comprises a corresponding value of one or more of at least a portion of a block acknowledgement (BA) bitmap field, a reserved field, a more data field, or an ACK mode field.

5. The apparatus of claim 1, wherein:
    the second error check value is provided in at least one or more of a portion of a frame identifier field of the packet, a portion of a starting sequence control field of the packet, a portion of a receive address field of the packet, or a portion of receive address (RA) field of the packet.

6. The apparatus of claim 1, wherein:
    the third information used to generate the second error check value comprises a corresponding value of at least one of a preferred modulation and coding scheme (MCS) field or an uplink data indication.

7. The apparatus of claim 1, wherein:
    the third information used to generate the second error check value comprises a corresponding value of at least one of a check beacon, a Partial Timing Synchronization Function (TSF), a More Null Data Packet (NDP) field, an uplink indication or a downlink indication.

8. The apparatus of claim 1, wherein:
    the second error check value is provided in at least one of a NDP paging frame identifier (P_IC) field of the packet, an ACK_ID field of the packet, or a NDP clear to send (CTS) frame identifier (CTS_ID) field of the packet.

9. The apparatus of claim 1, wherein:
    the third information used to generate the second error check value comprises a corresponding value of at least one of a More Data field, a Duration field, a delayed reverse direction grant (RDG) field, an ACK mode field, MCS feedback field.

10. The apparatus of claim 1, wherein the second error check value is generated by applying a logical function multiple times with the second information and the third information.

11. The apparatus of claim 1, wherein the second error check value is generated by applying a logical function recursively with the second information and the third information.

12. An apparatus for wireless communications, comprising:
    means for generating a first error check value for a packet to be transmitted to another apparatus, the first error check value generated based on first information in the packet;
    means for generating a second error check value for the packet based on second information in the packet that is known by the other apparatus and third information in the packet; and
    means for transmitting the packet to the other apparatus, the packet comprising the first and second error check values.

13. The apparatus of claim 12, wherein the second error check value is generated by performing a logical XOR operation with the second information and the third information.

14. The apparatus of claim 12, wherein:
    the second information comprises a corresponding value of at least a portion of a frame identifier field.

15. The apparatus of claim 14, wherein the third information used to generate the second error check value comprises a corresponding value of one or more of at least a portion of a block acknowledgement (BA) bitmap field, a reserved field, a more data field, or an ACK mode field.

16. The apparatus of claim 12, wherein:
the second error check value is provided in at least one or more of a portion of a frame identifier field of the packet, a portion of a starting sequence control field of the packet, a portion of a receive address field of the packet, or a portion of receive address (RA) field of the packet.

17. The apparatus of claim 12, wherein:
the third information used to generate the second error check value comprises a corresponding value of at least one of a preferred modulation and coding scheme (MCS) field or an uplink data indication.

18. The apparatus of claim 12, wherein:
the third information used to generate the second error check value comprises a corresponding value of at least one of a check beacon, a Partial Timing Synchronization Function (TSF), a More Null Data Packet (NDP) field, an uplink indication or a downlink indication.

19. The apparatus of claim 12, wherein:
the second error check value is provided in at least one of a NDP paging frame identifier (P_IC) field of the packet, an ACK_ID field of the packet, or a NDP clear to send (CTS) frame identifier (CTS_ID) field of the packet.

20. The apparatus of claim 12, wherein:
the third information used to generate the second error check value comprises a corresponding value of at least one of a More Data field, a Duration field, a delayed reverse direction grant (RDG field) field, an ACK mode field, MCS feedback field.

21. The apparatus of claim 12, wherein the second error check value is generated by applying a logical function multiple times with the second information and the third information.

22. The apparatus of claim 12, wherein the second error check value is generated by applying a logical function recursively with the second information and the third information.

23. A method for wireless communications by an apparatus, comprising:
generating a first error check value for a packet to be transmitted to another apparatus, the first error check value generated based on first information in the packet;
generating a second error check value for the packet based on second information in the packet that is known by the other apparatus and third information in the packet; and
transmitting the packet to the other apparatus, the packet comprising the first and second error check values.

24. The method of claim 23, wherein the second error check value is generated by performing a logical XOR operation with the second information and the third information.

25. The method of claim 23, wherein:
the second information comprises a corresponding value of at least a portion of a frame identifier field.

26. The method of claim 25, wherein the third information used to generate the second error check value comprises a corresponding value of one or more of at least a portion of a block acknowledgement (BA) bitmap field, a reserved field, a more data field, or an ACK mode field.

27. The method of claim 23, wherein:
the second error check value is provided in at least one or more of a portion of a frame identifier field of the packet, a portion of a starting sequence control field of the packet, a portion of a receive address field of the packet, or a portion of receive address (RA) field of the packet.

28. The method of claim 23, wherein:
the third information used to generate the second error check value comprises a corresponding value of at least one of a preferred modulation and coding scheme (MCS) field or an uplink data indication.

29. The method of claim 23, wherein:
the third information used to generate the second error check value comprises a corresponding value of at least one of a check beacon, a Partial Timing Synchronization Function (TSF), a More Null Data Packet (NDP) field, an uplink indication or a downlink indication.

30. The method of claim 23, wherein:
the second error check value is provided in at least one of a NDP paging frame identifier (P_IC) field of the packet, an ACK_ID field of the packet, or a NDP clear to send (CTS) frame identifier (CTS_ID) field of the packet.

31. The method of claim 23, wherein:
the third information used to generate the second error check value comprises a corresponding value of at least one of a More Data field, a Duration field, a delayed reverse direction grant (RDG) field, an ACK mode field, MCS feedback field.

32. The method of claim 23, wherein the second error check value is generated by applying a logical function multiple times with the second information and the third information.

33. The method of claim 23, wherein the second error check value is generated by applying a logical function recursively with the second information and the third information.

34. A non-transitory computer readable medium having instructions stored thereon, the instructions executable by an apparatus for:
generating a first error check value for a packet to be transmitted to another apparatus, the first error check value generated based on first information in the packet;
generating a second error check value for the packet based on second information in the packet that is known by the other apparatus and third information in the packet; and
transmitting the packet to the other apparatus, the packet comprising the first and second error check values.

35. A station, comprising:
at least one antenna;
a processing system configured to:
generate a first error check value for a packet to be transmitted to another station, the first error check value generated based on first information in the packet; and
generate a second error check value for the packet based on second information in the packet that is known by the other station and third information in the packet; and
a transmitter configured to transmit, via the at least one antenna, the packet to the other station, the packet comprising the first and second error check values.

* * * * *